Sept. 17, 1963   R. I. CRAIN ET AL   3,103,915
POULTRY LOADING DEVICE
Filed Dec. 15, 1961   2 Sheets-Sheet 1

INVENTORS.
ROY I. CRAIN
JACK D. KARNATH
BY Head & Johnson
ATTORNEYS

INVENTORS.
ROY I. CRAIN
JACK D. KARNATH

BY *Head & Johnson*
ATTORNEYS

United States Patent Office 3,103,915
Patented Sept. 17, 1963

3,103,915
POULTRY LOADING DEVICE
Roy I. Crain and Jack D. Karnath, Fayetteville, Ark., assignors to Roy I. Crain & Associates, Inc., Fayetteville, Ark., a corporation of Arkansas
Filed Dec. 15, 1961, Ser. No. 159,512
2 Claims. (Cl. 119—82)

This invention relates to a poultry loading device. More particularly, the invention relates to a device adaptable for automatically gathering poultry, such as chickens, from a pen or other confines where they are grown and transferring them into crates for shipment.

The poultry industry, and especially the raising of chickens, is growing rapidly to become one of the most important food industries. Because of the rapid growth of chickens and their efficiency in converting grain and other foods into meat, per capita poultry consumption is increasing yearly compared to other meat products.

Many innovations and inventions have been brought forth within the last few years to reduce the amount of manual labor required in the production of chickens. Such innovations include bulk feed distribution, automatic feeding and automatic watering. The processing of chickens after they have been taken to a processing plant is becoming highly automated,. One area has remained to this point which requires a great deal of time and which is still done almost exclusively by manual effort, and that is the problem of catching the chickens in the pen or other areas where they have been raised and placing them in crates for transportation to the processing plants.

Chickens, and most other types of poultry, are very fractious creatures and are very difficult to capture. The capturing and loading of a flock of several thousand chickens is a time consuming and highly disagreeable task. In addition, because of their fractious nature, it is very easy for them to injure themselves as they fly and run about to avoid being captured.

In order to provide a means to eliminate the necessity of manually capturing chickens when they are ready to be transferred to market, this invention provides a completely automated and mechanical system for transferring chickens, and other similar types of poultry, directly from a pen into crates.

It is therefore an object of this invention to provide a means of mechanically capturing and transferring chickens into crates.

More particularly, this invention provides a means whereby a flock of chickens to be crated may be herded into an area wherein they are crowded onto a conveyor system which conveys them into a loading device where the chickens are placed in crates.

Another object of this invention is to provide a type of ramp leading onto a moving conveyor having the unique advantage that chickens will unhesitantly walk on the ramp and onto the moving conveyor to be conveyed into a poultry loading device with a minimum amount of resistance.

Another object of this invention is to provide a poultry loading device adaptable to receive poultry from a conveyor system and to deposit the poultry into a crate in a manner least likely to injury the poultry and including means preventing the poultry from escaping from the crates after they are in the crates.

Another object of this invention is to provide a poultry loading device including means of filling two crates at one time with chickens and including means whereby the chickens are deposited alternately into the crates so that when a crate is filled it may be removed and an empty crate inserted to receive chickens without interrupting the flow of chickens from the poultry gathering device.

These and other objects and a better understanding of the invention may be had from the following description and claims taken in conjunction with the attached drawings in which:

The poultry loading device of this invention consists of three basic portions or elements which function together to automatically load chickens from a pen, chicken house or other area where they may be confined, into crates. The three basic elements include: A poultry crating device or member, indicated generally by the numeral 10 in FIGURES 1, 2 and 3; a conveyor, indicated generally by the numeral 11 in FIGURES 1, 3 and 4; and a poultry gathering device or member, indicated generally by the numeral 12 in FIGURES 3 and 4. Each of the three elements have utility within themselves and may be used in combination with other components for different purposes, but these components including the unique portions of each which will be described subsequently, are combined together according to the principles of this invention to provide a poultry loading device which accomplishes a heretofore unobtainable objective.

Figure 1:
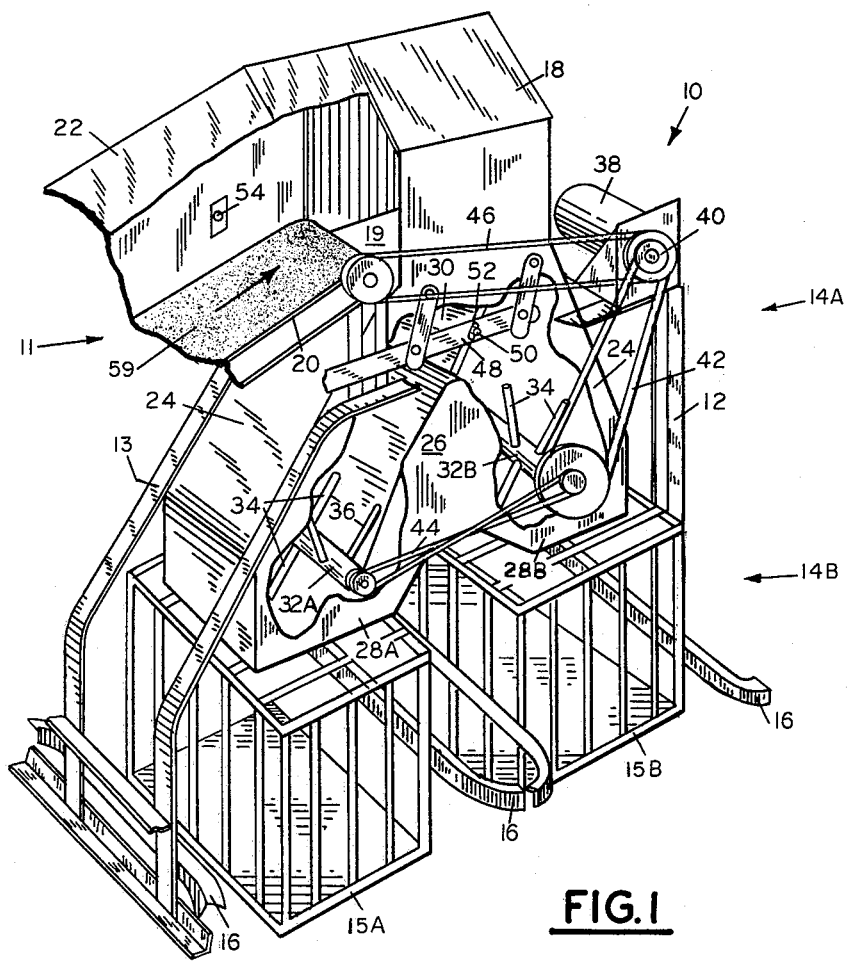
FIGURE 1 is an isometric view, shown partially cut away, of the poultry crating device of this invention.

Referring now to the drawings and first to FIGURE 1, the poultry crating device 10 is best described. The poultry crating device 10 consists of a framework 13 which has generally an upper portion 14A and a lower portion 14B. The lower portion 14B is designed to receive crates 15A and 15B. Crate guide means 16 are provided to properly align the crates 15A and 15B within the poultry crating device 10. Conveyors (not shown) may be provided to conduct crates 15A and 15B into and out of the crating device 10, or they may be manually positioned in their proper places.

Crates 15A and 15B are typically slotted to provide ample ventilation. The crates 15A and 15B are provided with open tops, the open tops being hidden by the poultry crating device 10. The open tops are closed by lids (not shown), which are typically hinged to the crates. Crates 15A and 15B may be of varying sizes, but as typically used in the industry are designed to hold approximately fifteen chickens each.

Affixed to the upper portion 14A of the crating device 10 is a feeder housing 18 which covers a feeder opening 19. Feeder housing 18 is closed at the top and on all sides except one which receives conveyor 11. Intersecting feeder housing 18 and covering the top of conveyor 11 is a conveyor housing 22. Chickens are carried on the conveyor 11 within conveyor housing 22 and are deposited into the feeder housing 18 to pass into the crating device 10 through feeder opening 19.

After entering feeder housing 18, the chickens fall downwardly through feeder opening 19 into chute housing 24. Interposed at the middle and lower portion of chute housing 24 is a chute deflector 26. The chute deflector 26 is of an inverted V configuration dividing chute housing 24 into two individual chutes 28A and 28B. Chute 28A discharges into crate 15A and chute 28B discharges into crate 15B.

Pivotally supported adjacent the upper end of chute deflector 26 is a flop gate 30 which operates back and forth to guide chickens which enter the feeder opening 19 to be ultimately discharged alternately between chutes 28A and 28B. In this way, two crates 15A and 15B can be filled simultaneously which allows time, while a chicken is being discharged into one crate, to replace a full crate with an empty crate so that the flow of chickens through the crating device 10 can continue uninterrupted.

Supported adjacent the outlets of individual chutes are reel members 32A and 32B, each having a multiplicity of long flexible fingers 34 extending therefrom which protrude into chutes 28A and 28B. Formed in the chute deflector 26 are finger slots 36 which allow fingers 34 to pass through as reel members 32A and 32B rotate.

Reel members 32A and 32B rotate in opposite directions to move fingers 34 always downwardly in chutes 28A and 28B. The function of reel members 32A and 32B and fingers 34 is twofold. First, to ease the downward movement of chickens after they have entered the feeder opening 19 so that the chickens will not fall suddenly downward to be bruised or otherwise injured. Second, the rotation of reel members 32A and 32B keep the multitude of flexible fingers 34 moving downwardly in chutes 28A and 28B so that chickens, after they have passed down through chutes 28A and 28B and into crates 15A and 15B, cannot fly back up and out of the crates.

Figure 2:
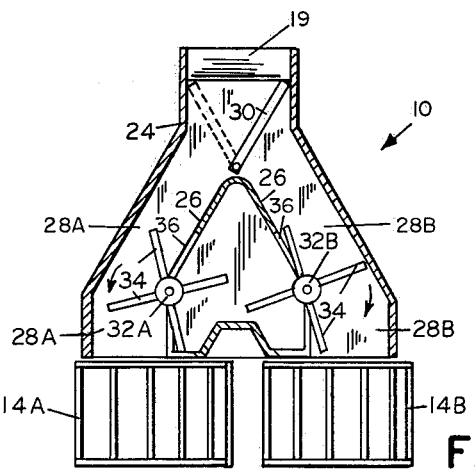
FIGURE 2 is a cross-sectional view of the poultry crating device of FIGURE 1.

The cross-sectional view of FIGURE 2 shows the relative position of the reel members 32A and 32B, having flexible fingers 34 formed thereon, and chute deflector 26. Flop gate 30 is shown in its pivotal position relative to chute deflector 26 to show how it serves to deflect chickens alternately into chute 28A and then into chute 28B.

Referring back to FIGURE 1, a power unit 38, which may either be an electrical motor, a gasoline engine, or a pneumatic or a hydraulic motor, is provided. In practice, a hydraulic power unit 38 is preferred, which may be operated from a truck hydraulic unit. Power unit 38, by pulley 40, through belt 42 rotates reel member 32B. A belt 44 which is looped in a figure eight configuration extends from reel member 32B to reel member 32A to rotate in the opposite direction. Other means of rotating reel members 32A and 32B will be suggested.

Power unit 38, in addition, by belt 46 supplies power for conveyor 11.

Supported to framework 13 of the poultry crating device 10 is a flop gate operating linkage 48. A flop gate pin 50 extends from the flop gate 30 to a slot 52 in the flop gate operating linkage 48 to move the flop gate 30 back and forth so that chickens which enter feeder opening 19 are directed to be discharged alternately from chutes 28A and 28B.

Flop gate operating linkage 48 may be actuated as by a hydraulic cylinder controlled by a solenoid valve (not shown). A chicken counting switch 54, which may be in the form of a photo-electric cell actuated as a chicken passes in front thereof, serves to control the movement of flop gate operating linkage 48 so that chickens which pass into feeder housing 18 are placed alternately in crates 15A and 15B.

Various means of counting the number of chickens which pass into feeder housing 18 will be readily suggested and in addition, means of utilizing this information for the proper actuation of flop gate operating linkage 48 is within the purview of ordinary mechanical skill and for this reason the details of construction of these elements are not shown in detail.

Figure 3:
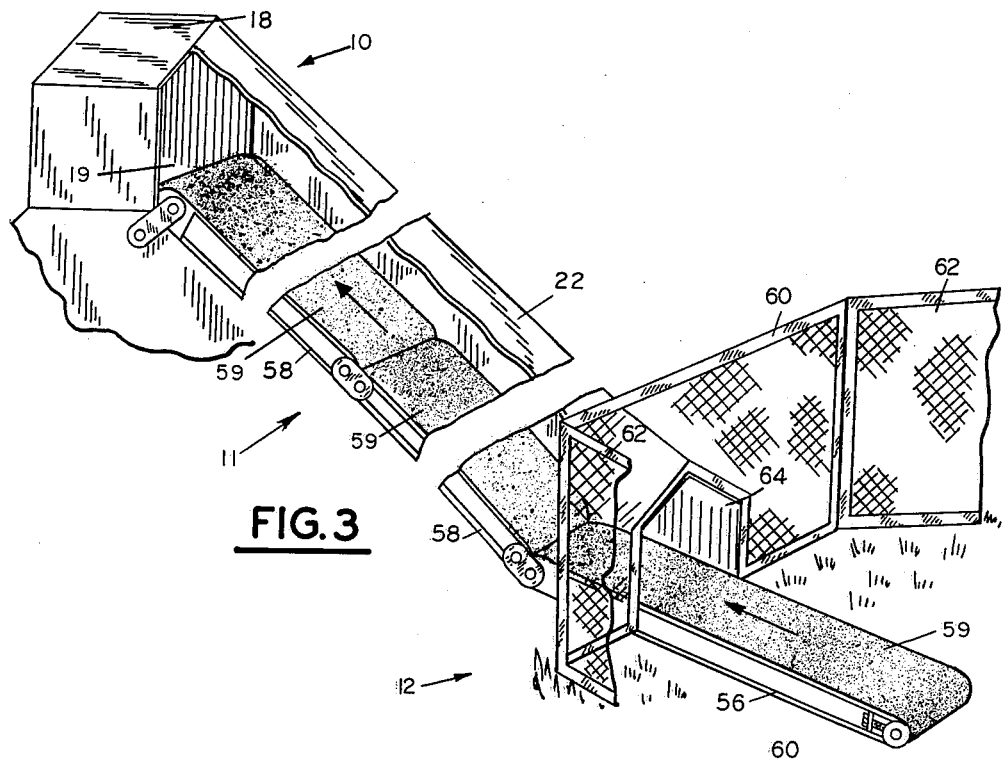
FIGURE 3 is an isometric and partially cut away view of a conveyor adaptable for use to convey chickens from a poultry gathering means to the poultry crating device of FIGURE 1.

Typically, the poultry crating device 10 may be mounted on the bed of a truck for transportation to the area where chickens are to be loaded. In order to convey the chickens to the crating device 10, a conveyor 11 is provided, shown best in FIGURE 3. The conveyor, generally indicated by the numeral 11 in FIGURE 3, is made up of a substantially horizontal section 56 and a number of riser sections 58, each having a flat belt 59 which moves over the top of each section in the direction of feeder housing 18. The sections 56 and 58 are connected together in a means whereby each succeeding section 58 is supplied power by the preceding section for rotation. The speed of rotation of succeeding sections diminishes toward section 56 so that a chicken which gets on the horizontal section 56 is conveyed to the feeder housing 18 at a continuously faster rate. The importance of providing a conveyor so that each section moves at a faster rate is twofold. First, it prevents chickens from being injured by their toes or wing feathers being caught between sections. Second, it increases spacings between the chickens as they approach feeder housing 18 for the proper operation of flop gate 30 as has been previously described.

Positioned over horizontal section 56 of conveyor 11 are perpendicular gathering screens 60. Hinged to perpendicular gathering screens 60 are lateral gathering screens 62. Lateral gathering screens 62 extend outwardly from perpendicular gathering screen 60 in a manner to provide in effect a large funnel shaped configuration whereby a flock of chickens may be directed into the funnel area. When in the funnel area formed by gathering screens 60 and 62, they will be concentrated onto the moving belt 59 of horizontal section 56 of conveyor 11. An opening 64 in the perpendicular gathering screen 60 receives horizontal section 56 of conveyor 11 and permits chickens which find themselves on the conveyor 11 to pass therethrough.

A conveyor housing 22, which as formerly described extends over conveyor 11, extends from the feeder housing 18 to perpendicular screen 60 so that a chicken, after passing through opening 64, cannot escape from ultimately being deposited in a crate 15A or 15B.

It has been learned that chickens experience a peculiar behavior when they find themselves on a moving object, due to some unexplained psychological reaction. Finding themselves crowded onto moving conveyor belt 59, they do not ordinarily make a serious effort to escape off of the belt but have a tendency to "freeze." For this reason, the loading device shown in FIGURE 3 is unexpectedly successful. A flock of chickens herded by the funnel effect of gathering screens 60 and 62 into the vicinity of horizontal section 56 of conveyor 11 are crowded gradually onto the conveyor and due to the peculiar reaction of the chickens they, making no attempt to escape from the conveyor, are readily carried through the opening to crating device 10.

The combination of the horizontal conveyor section 56 with gathering screens 60 and 62 make up a poultry gathering device, generally indicated by the numeral 12.

Figure 4:
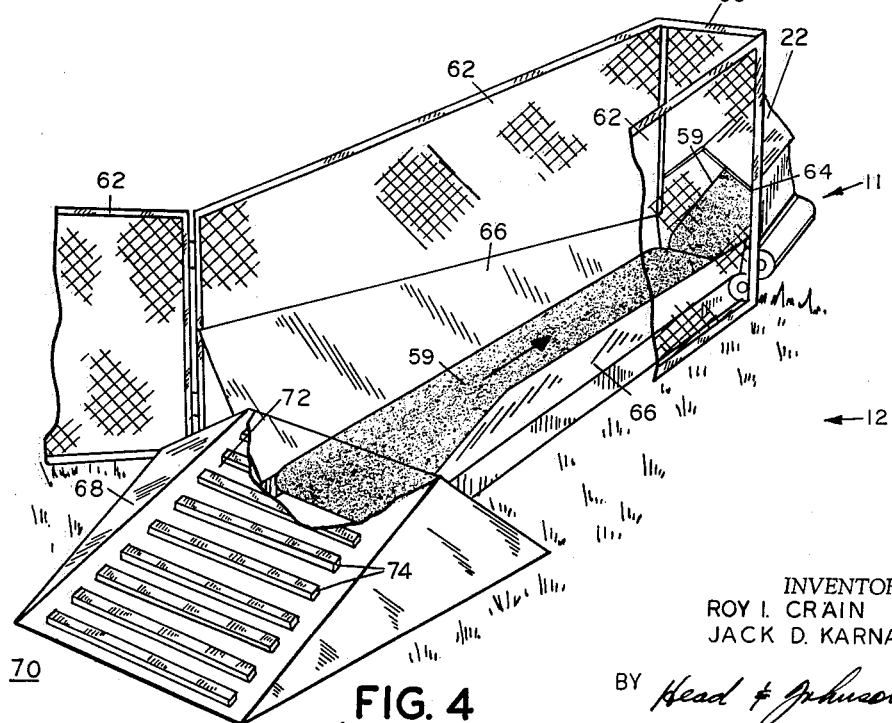
FIGURE 4 is an isometric view of an alternate arrangement of a novel poultry gathering means for use with the conveyor system of FIGURE 3.

An alternate device for gathering chickens onto conveyor 11 which has proven highly successful is shown in FIGURE 4. In this device a rather small perpendicular gathering screen 60 is utilized having opening 64 therein, with lateral gathering screens 62 extending backwards from the perpendicular gathering screen 60 to form a sharper funnel effect. Conveyor housing 22 extends over conveyor 11 to conform to opening 64 in the same manner as shown in FIGURE 3. Positioned along the side, and extending upwardly at an angle from each side of the horizontal section 56 of conveyor 11, are deflector plates 66. The function of deflector plates 66 is to force any chickens which are on horizontal section 56 of conveyor 11, and which try to escape, to slide downwardly and back onto the conveyor. A flock of chickens crowded into the funneled area formed by gathering screens 60 and 62 and deflectors 66 are concentrated onto the moving conveyor belt 59 and are conducted through opening 64.

An additional device which has proven unexpectedly successful in guiding chickens onto conveyor 11 is a ramp 68. Ramp 68, which extends from the loading floor 70 upwardly, covers the end of the conveyor horizontal section 56 so that the end movement of the conveyor is concealed. The inclined walking surface 72 of ramp 68 is provided with a rough finish, such as by means of longitudinal openings 74, so that chickens can easily get a foothold to walk up the ramp 68. After having walked up the ramp 68, the chickens naturally step off onto the moving conveyor belt 59 and are thus conveyed through opening 64 and into the crating device.

As has been previously mentioned, chickens as well as most other types of poultry, are a very fractious type animal and are extremely difficult to drive through an opening. The provision of a moving conveyor 11 has been found to be unexpectedly successful in causing chickens to be involuntarily moved through an opening. The improvements shown in FIGURE 4, augmenting the basic poultry gathering device 12 of FIGURE 3, has solved the problem of gathering chickens for mechanical processing.

As has been previously mentioned also, the poultry gathering system 12 which consists basically of the horizontal section 56 of conveyor 11, and gathering screens 60 and 62, is typically placed within the loading area where the chickens are free to move about, such as the pen where they have been raised. The poultry crating device 10, as shown in FIGURE 1, may either be placed within the confines where the chickens are found or conveyor 11 may be extended a distance to pass beyond the area where the chickens are confined.

With power supplied to the poultry crating device 10 by power unit 38, the conveyor 11 starts moving and simultaneously reel members 32A and 32B begin to rotate. A flock of chickens which are to be crated are herded into the poultry gathering device 12, as shown in FIGURES 3 and 4, and pass onto the conveyor 11 and within conveyor housing 22, to be sequentially deposited through feeder opening 19. Chickens passing off the end of conveyor 11 fall down through feeder opening 19 into chute 28A or 28B, and past fingers 34 of reel members 32A or 32B to enter crate 15A or 15B. Flop gate 30, actuated by a counter, such as indicated by counter switch 54, alternately distributes the chickens so that two crates 15A and 15B are simultaneously filled, permitting a crate, when it is filled with the prescribed number of chickens, to be quickly replaced while the chicken passing at the time through the machine is deposited in the opposite crate.

This invention has been described as it is adapted to loading chickens. This is by way of example only as the principles of the invention are equally adaptable to the loading of other types of poultry, and particularly to the loading of turkeys.

The poultry loading device of this invention makes possible the loading of a large number of chickens from a given area by a relatively few number of workers in a relatively short time.

Although this invention has been described with a certain degree of particularity, it is manifested that many changes may be made in the details of construction and the arrangement of components without departing from the spirit and scope of this disclosure.

We claim:

1. A poultry loading deviec for loading chickens and the like into a crate having an open top, comprising, in combination:

a poultry crating member adaptable for receiving said crate into the lower portion thereof, said crating member having a feeder opening in the upper portion thereof adaptable to receive said chickens therein and said crating member having a chute therein communicating said feeder opening with said open top of said crate as said crate is positioned in said crating member;

a conveyor means communicating at one end thereof with said feeder opening of said crating member, said conveyor means extending to receive said chickens thereon and to convey said chickens into said feeder opening of said crating member;

a reel member rotatably supported in said crating member, said reel member having a multiplicity of flexible fingers extending therefrom, said flexible fingers extending into said chute; and means of rotating said reel member whereby said chickens entering said crate are prevented from escaping said crate by way of said chute.

2. A poultry loading device for loading chickens and the like into crates, said crates each having an open top, comprising, in combination:

a poultry crating member having an upper and lower portion, said crating member adaptable for receiving two of said crates concurrently in said lower portion thereof, said crating member having a feeder opening in said upper portion thereof adaptable to receive said chickens therein, said crating member having a first and second chute therein, said first chute communicating said feeder opening with said open top of one of said crates as said crates are positioned in said crating member, said second chute communicating said feeder opening with said open top of the other of said crates as said crates are positioned in said crating member;

a flop gate pivotally supported in said feeder opening adaptable to alternately close said first and second chutes whereby chickens entering said feeder opening are directed into said first or second chute;

a conveyor means communicating at one end thereof with said feeder opening in said crating member, said conveyor means extending to receive said chickens thereon and to convey said chickens into said feeder opening at said crating member;

a flop gate control means whereby said flop gate is automatically positioned to close alternately said first and second chutes whereby said first and second chutes as positioned in said crating member receive said chickens entering said feeder opening of said crating member alternately whereby said first and second crates are filled with said chickens substantially simultaneously;

a first reel member rotatably supported in said crating member, said first reel member having a multiplicity of flexible fingers extending therefrom, said flexible fingers extending into said first chute as said first reel member is rotated;

a second reel member rotatably supported in said crating member, said second reel member having a multiplicity of flexible fingers extending therefrom, said flexible fingers extending into said second chute as said second reel member is rotated; and means of rotating said reel members whereby said chickens entering said crates are prevented from escaping from said crates by way of said chutes.

References Cited in the file of this patent

UNITED STATES PATENTS

| | | |
|---|---|---|
| 1,090,670 | Zimmerman | Mar. 17, 1914 |
| 2,648,307 | Bowers | Aug. 11, 1953 |
| 2,840,041 | Fleming | June 24, 1958 |
| 2,968,831 | Zebarth | Jan. 24, 1961 |
| 3,001,410 | Letson | Sept. 26, 1961 |